United States Patent
Larminy et al.

(10) Patent No.: US 11,597,433 B2
(45) Date of Patent: Mar. 7, 2023

(54) METHOD FOR DETERMINING A SETPOINT TORQUE ON THE BASIS OF A REVERSIBILITY FUNCTION CALCULATING A TARGET SPEED OF A STEERING WHEEL DEPENDING ON A STEERING WHEEL ANGLE AND A YAW RATE

(71) Applicant: JTEKT EUROPE, Irigny (FR)

(72) Inventors: Pierre Larminy, Oullins (FR); André Michelis, Chonas l'Amballan (FR); Pascal Moulaire, La Tour de Salvagny (FR); Christophe Ravier, Saint Pierre de Chandieu (FR)

(73) Assignee: JTEKT EUROPE, Irigny (FR)

( * ) Notice: Subject to any disclaimer, the term of this patent is extended or adjusted under 35 U.S.C. 154(b) by 183 days.

(21) Appl. No.: 17/276,601

(22) PCT Filed: Oct. 1, 2019

(86) PCT No.: PCT/FR2019/052309
§ 371 (c)(1),
(2) Date: Mar. 16, 2021

(87) PCT Pub. No.: WO2020/070428
PCT Pub. Date: Apr. 9, 2020

(65) Prior Publication Data
US 2022/0041208 A1 Feb. 10, 2022

(30) Foreign Application Priority Data
Oct. 3, 2018 (FR) ...................................... 18/59168

(51) Int. Cl.
*B62D 5/04* (2006.01)

(52) U.S. Cl.
CPC .................................. *B62D 5/0466* (2013.01)

(58) Field of Classification Search
CPC .................................................... B62D 5/0466
See application file for complete search history.

(56) References Cited

U.S. PATENT DOCUMENTS

| 5,448,482 A | 9/1995 | Yamamoto et al. |
| 2017/0137057 A1 | 5/2017 | Kitazume |

FOREIGN PATENT DOCUMENTS

| DE | 10 2010 024 171 A1 | 12/2011 |
| EP | 2 275 323 A1 | 1/2011 |

(Continued)

OTHER PUBLICATIONS

Feb. 24, 2020 Search Report issued in International Patent Application No. PCT/FR2019/052309.

(Continued)

*Primary Examiner* — Mathew Franklin Gordon
(74) *Attorney, Agent, or Firm* — Oliff PLC

(57) ABSTRACT

A method for determining a setpoint torque for a steering wheel of a power-assisted steering system of a vehicle, the setpoint torque making it possible to determine a motor torque applied directly or indirectly by a control motor to the steering wheel, and the setpoint torque being at least determined by a reversibility function designed to bring a steering wheel angle of the steering wheel toward the steering wheel angle at which the vehicle will follow a trajectory in a straight line, the reversibility function comprising a first step in which a target speed of the steering wheel is determined depending on the steering wheel angle, wherein the target speed is also a function of a yaw rate of the vehicle.

8 Claims, 2 Drawing Sheets

(56) References Cited

FOREIGN PATENT DOCUMENTS

| | | |
|---|---|---|
| WO | 2011/010058 A1 | 1/2011 |
| WO | 2012/048782 A1 | 4/2012 |
| WO | 2018/142650 A1 | 8/2018 |

OTHER PUBLICATIONS

Feb. 24, 2020 Written Opinion of the International Searching Authority issued in International Patent Application No. PCT/FR2019/052309.

METHOD FOR DETERMINING A SETPOINT TORQUE ON THE BASIS OF A REVERSIBILITY FUNCTION CALCULATING A TARGET SPEED OF A STEERING WHEEL DEPENDING ON A STEERING WHEEL ANGLE AND A YAW RATE

The invention concerns the field of electric power steering systems and more particularly a method for determining a setpoint torque for a steering wheel of an electric power steering system of a vehicle.

The purpose of a steering system of a vehicle is to allow a driver to control a trajectory of the vehicle. The trajectory is described by a set of successive positions occupied by a vehicle over time. The vehicle trajectory is a curve dependent on a set of parameters, which can be measured or calculated. Said parameters vary depending on a state of the forces being applied on the vehicle so as to produce a movement. The state of the forces will be referred to hereinafter as the dynamic situation of the vehicle.

By changing an angle of orientation of the vehicle's wheels, the driver acts on a parameter of the dynamic situation of the vehicle so as to change the trajectory of the vehicle. The angle of orientation of the wheels is in particular linked to an angle of a steering wheel, hereinafter referred to as «steering wheel angle». The driver changes the steering wheel angle by exerting a force on the steering wheel, hereinafter called «steering wheel torque».

Generally, a steering system comprises several elements including said steering wheel, a rack, and two wheels each connected to a tie rod. The rack is the part allowing maneuvering the wheels, that is to say, allowing changing the angle of orientation of the wheels, via the tie rods. The rack allows transmitting a variation in the steering wheel angle into an orientation of the vehicle's wheels.

An electric power steering system comprises a computer which determines in particular a torque to be felt by the driver when maneuvering the steering wheel, hereinafter referred to as setpoint torque.

Generally, the setpoint torque is determined by a sum of several functions, preferably 3 functions. A function allows determining a fraction of the setpoint torque.

For example, a Damping function allows determining a fraction of the setpoint torque based on a speed of rotation of the steering wheel, hereinafter called «steering wheel speed».

A control function allows determining a fraction of the setpoint torque based on a force being exerted on the rack.

A reversibility function allows determining a fraction of the setpoint torque allowing bringing the steering wheel angle «to the center», that is to say towards the steering wheel angle for which the vehicle performs a straight-line trajectory, hereinafter called «central angle». In other words, the reversibility function allows bringing the steering wheel back so that the vehicle performs a straight-line trajectory. This function is particularly useful when exiting a roundabout, for example. In this case, the driver holds the steering wheel so as to turn then he lets go of the steering wheel so that the steering wheel «naturally» returns to the center.

It is known to carry out the reversibility function by determining, at first, a target speed of the steering wheel as a function of the steering wheel angle. The target speed is high when the steering wheel angle is away from the central angle and decreases when the steering wheel angle approaches the central angle. Thus, the steering wheel quickly returns, at first, to the central angle then slows down until reaching the central angle.

A drawback of this determination of the target speed is that it is based on static information, the steering wheel angle, without taking into account the dynamic situation of the vehicle. Thus, the target speed at a given angle is identical regardless of the vehicle dynamics and type of road surface. In doing so, the target speed may not be adapted to the dynamic situation of the vehicle, resulting in an unnatural driving feeling for the driver.

Finally, when the setpoint torque is determined, the computer servo-controls the steering wheel torque to the setpoint torque thanks to a control motor. The control motor exerts a motor torque so that the steering wheel torque is equal to the setpoint torque.

In a mechanical-type electric power steering system, there is a mechanical link, generally made by a steering column, between the steering wheel and the rack. The control motor then exerts the motor torque indirectly on the steering wheel, by exerting the motor torque on the rack or on the steering column.

A «by-wire» type electric power steering system comprises two motorizations. The steering wheel angle is measured or calculated so that a maneuvering motor changes the orientation of the vehicle's wheels via the rack. The control motor then directly exerts the motor torque on the steering wheel so as in particular to make the driver aware of an inertia of the rack, that is to say a weight of the rack.

The invention aims at improving the driving feeling of the driver by proposing a method for determining a setpoint torque for a steering wheel of a power steering system of a vehicle, said setpoint torque allowing determining a motor torque which is applied directly or indirectly by a control motor on the steering wheel, said setpoint torque being at least determined by a reversibility function intended to bring a steering wheel angle of the steering wheel towards the steering wheel angle for which the vehicle performs a straight-line trajectory, said reversibility function comprising a first step in which a target speed of the steering wheel is determined as a function of the steering wheel angle, characterized in that the target speed is also a function of a yaw rate of the vehicle.

The yaw rate represents the speed of rotation of the vehicle about a vertical axis, that is to say, an axis normal to a plane in which the vehicle performs the trajectory.

According to the invention, the target speed is based on static information, the steering wheel angle, and on dynamic information, the yaw rate. The target speed thus takes into account a dynamic situation of the vehicle such that the driving feeling of the driver is natural.

In other words, for the same steering wheel angle, the target speed of return of the steering wheel angle to the central angle will be more or less fast depending on the yaw rate. Thus, when the driver lets go of the steering wheel so that he returns to the central angle, the steering wheel speed is adapted to the yaw rate of the vehicle.

According to one feature of the invention, the first step comprises a determination phase in which an equivalent steering wheel angle is calculated depending on the yaw rate of the vehicle, an equivalent gain and a longitudinal speed of the vehicle.

The longitudinal speed of the vehicle corresponds to the speed of a trajectory of the vehicle made along an axis of elongation of said vehicle.

More specifically, the equivalent steering wheel angle is calculated by the formula below:

$$A_{veq} = \frac{K_{eq} \cdot V_l}{V_h}$$

With: $A_{veq}$: the equivalent steering wheel angle expressed in degrees (°), $K_{eq}$: the equivalent gain expressed in degrees (m), $V_l$: the yaw rate of the vehicle (°/s) and $V_h$: the longitudinal speed of the vehicle (m/s).

Thus, the equivalent steering wheel angle is determined from the yaw rate and the longitudinal speed of the vehicle.

According to one feature of the invention, the determination phase comprises a protection allowing avoiding carrying out a division by 0 when the longitudinal speed of the vehicle is zero.

According to one feature of the invention, the equivalent gain depends on the longitudinal speed of the vehicle.

Varying the equivalent gain with the longitudinal speed of the vehicle allows improving the consistency between the steering wheel angle and the equivalent steering wheel angle. Indeed, the dynamic situation of the vehicle depends on the speed of the vehicle (understeer gradient, aerodynamic lift, etc.).

For example, the equivalent gain depends on the understeer gradient according to the following relation:

$$K_{eq} = L + K \cdot V_h^2$$

With: L: vehicle wheelbase, K: understeer gradient, $V_h$: longitudinal vehicle speed.

According to one feature of the invention, the first step comprises a fusion phase in which a final steering wheel angle is determined from the equivalent steering wheel angle and from the steering wheel angle.

Thus, the determination of the target speed is made from the final steering wheel angle comprising the information of the steering wheel angle and the information of the yaw rate via the equivalent steering wheel angle.

According to one feature of the invention, the final steering wheel angle depends on a fusion gain.

More specifically, the final steering wheel angle is calculated by the formula below:

$$A_f = G \cdot A_v + (1-G) \cdot A_{veq}$$

With $A_f$: the final steering wheel angle, G: the fusion gain, $A_v$: the steering wheel angle, $A_{veq}$: the equivalent steering wheel angle.

With the above formula, the fusion gain weights the steering wheel angle and the equivalent steering wheel angle symmetrically. In doing so, the final steering wheel angle maintains a reliable value.

The fusion gain allows promoting information coming from the steering wheel angle or the equivalent steering wheel angle.

According to one feature of the invention, the fusion gain varies depending on the longitudinal speed of the vehicle.

Thus, it is easy to adjust the fusion gain so as to take into account the dynamic situation of the vehicle.

According to one feature of the invention, the fusion gain varies between 0 and 1.

The fusion gain is a dimensionless magnitude.

Thus, when the fusion gain is close to 1, the information coming from the steering wheel angle is favored, while when the fusion gain is close to 0, the information coming from the equivalent steering wheel angle is favored.

According to a feature of the invention, the determination method, comprises a second step in which a setpoint torque of the reversibility function is determined from the target speed.

The setpoint torque of the reversibility function corresponds to the setpoint torque or only to a fraction of said setpoint torque if the setpoint torque is determined by a plurality of functions.

The invention will be better understood, thanks to the description below, which relates to an embodiment according to the present invention, given by way of non-limiting example and explained with reference to the appended schematic drawings, in which.

The invention concerns a method for determining a setpoint torque $C_c$ for a steering wheel of a power steering system of a vehicle, and more particularly for a motor vehicle intended for transporting people.

In a manner known per se, said power steering system comprises a steering wheel which allows a driver to maneuver said power steering system by exerting a force, called «steering wheel torque» $C_V$, on said steering wheel.

Subsequently, the considered power steering system is a mechanical-type electric power steering system. It is, however, of course, that the invention can also relate to a «by-wire» type electric power steering system.

Thus, the steering wheel is preferably mounted on a steering column, guided in rotation on the vehicle, and which meshes, by means of a steering pinion, on a steering rack, which is itself guided in translation in a steering casing which is fastened to said vehicle.

Preferably, the ends of said steering rack are each connected to a steering tie rod coupled to the steering knuckle of a steering wheel (respectively a left wheel and a right wheel), such that the longitudinal translational displacement of the rack allows changing a steering angle (yaw angle) of the steered wheels. The steering angle is at least partially determined by an angle of the steering wheel, hereinafter referred to as steering wheel angle $A_V$.

The steered wheels can moreover preferably also be drive wheels.

The power steering system also comprises a control motor which is intended to provide a motor torque $C_M$ to assist the maneuver of said power steering system.

The control motor will preferably be an electric motor, with two operating directions, and preferably a rotary electric motor, of the brushless type.

The control motor can engage, where appropriate via a reducer of the gear reducer type, either on the steering column itself, to form a mechanism called «single pinion» mechanism, or directly on the steering rack, for example by means of a second pinion which is distinct from the steering pinion which allows the steering column to engage on the rack, so as to form a mechanism called «double pinion» mechanism, or else by means of a ball screw which cooperates with a corresponding thread of said rack, at a distance from said steering pinion.

Figure 1:
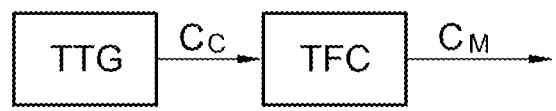
FIG. 1 is a logic diagram of an algorithm allowing a determination of a motor torque.

FIG. 1 represents a simplified logic diagram of an algorithm allowing determining the motor torque $C_M$. Said motor torque $C_M$ is applied by the control motor directly or indirectly on the steering wheel.

More specifically, the algorithm comprises a step of TTG development of a setpoint torque $C_c$. The TTG development step receives as input a plurality of parameters dependent on a dynamic situation of the vehicle. These parameters are measured or calculated by a vehicle computer.

The setpoint torque $C_c$ is the steering torque desired to be felt by a driver when he turns the steering wheel. Thus it is desired that the steering wheel torque $C_V$ is equal to the setpoint torque $C_c$. The setpoint torque $C_c$ is determined to allow, for example, facilitating or conversely preventing a rotation of the steering wheel by the driver.

In order for the driver to feel the setpoint torque $C_c$, the steering wheel torque $C_V$ is servo-controlled to the setpoint torque $C_c$ during a TFC servo-control step.

During the TFC servo-control step, the motor torque $C_M$ applied by the control motor directly or indirectly on the steering wheel is determined in order to obtain an equality between the setpoint torque $C_c$ and the steering wheel torque $C_V$.

Thus, the purpose of the control motor is to servo-control a steering wheel torque $C_V$, exerted by a driver on the steering wheel, to a setpoint torque $C_c$.

Figure 2:
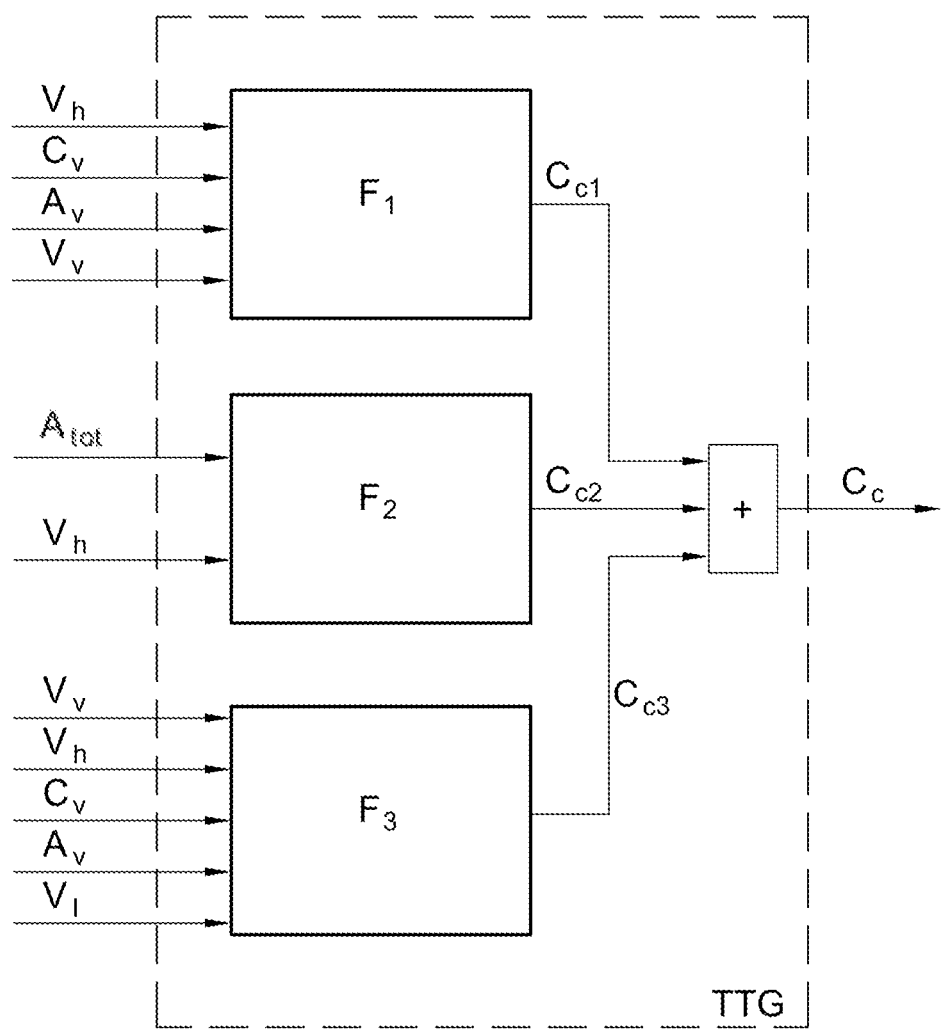
FIG. 2 is a portion of the logic diagram according to FIG. 1 allowing determining a setpoint torque according to the invention.

The determination of the setpoint torque $C_c$ is more specifically described in FIG. 2 which represents the TTG development step.

The TTG development step comprises a Damping function $F_1$ allowing determining a first fraction $C_{C1}$ of the setpoint torque $C_c$. The Damping function $F_1$ receives as input a longitudinal speed $V_h$ of the vehicle, the steering wheel torque $C_V$, the steering wheel angle $A_V$, and a speed of rotation $V_v$ of the steering wheel, hereinafter called «steering wheel speed».

The TTG development step comprises a control function $F_2$ allowing determining a second fraction $C_{C2}$ of the setpoint torque $C_c$. The control function $F_2$ receives as input an equivalent lateral acceleration $A_{tot}$ and the longitudinal speed $V_h$ of the vehicle. The equivalent lateral acceleration $A_{tot}$ is a virtual magnitude having a dimension of an acceleration ($L \cdot T^{-2}$). The equivalent lateral acceleration is calculated from at least one force being exerted on the rack, that is to say a force representative of the force being exerted on the wheels.

The TTG development step includes a reversibility function $F_3$ allowing determining a third fraction $C_{C3}$ of the setpoint torque $C_c$ allowing bringing the steering wheel angle $A_V$«to the center», that is to say towards the steering wheel angle $A_V$, for which the vehicle performs a straight-line trajectory, hereinafter called «central angle». The reversibility function $F_3$ receives as input the longitudinal speed $V_h$ of the vehicle, the steering wheel torque $C_V$, the steering wheel angle $A_V$, the steering wheel speed $V_v$, and a yaw rate $V_l$ of the vehicle.

Figure 3:
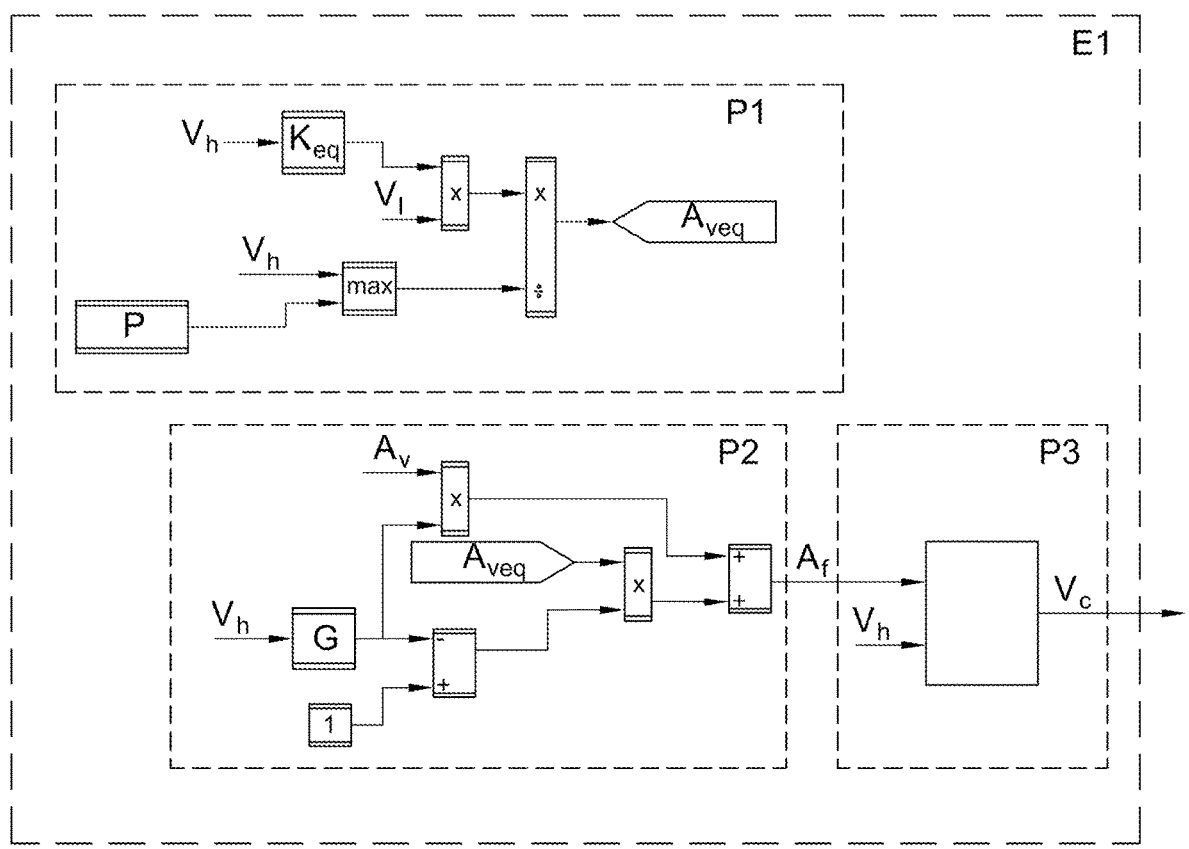
FIG. 3 is a logic diagram of a first step of a reversibility function according to the invention.

The reversibility function $F_3$ comprises a first step E1, represented in FIG. 3, in which a target speed $V_c$ of the steering wheel is determined.

More specifically, the first step E1 comprises a determination phase P1 in which an equivalent steering wheel angle $A_{veq}$ is calculated by the formula below:

$$A_{veq} = \frac{K_{eq} \cdot V_l}{\max(V_h, P)}$$

With: $A_{veq}$: the equivalent steering wheel angle expressed in degrees (°), $K_{eq}$: the equivalent gain expressed in degrees (m), $V_l$: the yaw rate of the vehicle (°/s) and $V_h$: the longitudinal speed of the vehicle (m/s), P: a protection value.

The equivalent gain $K_{eq}$ depends on the longitudinal speed $V_h$ of the vehicle.

Furthermore, in order not to carry out a division by 0 when the longitudinal speed $V_h$ is zero, the above formula is divided by the maximum value selected between the protection P and the longitudinal speed $V_h$. The protection P is a constant close to 0.

The first step E1 then comprises a fusion phase P2 in which a final steering wheel angle $A_f$ is determined according to the formula below:

$$A_f = G \cdot A_v + (1-G) \cdot A_{veq}$$

With $A_f$: the final steering wheel angle, G: a fusion gain, $A_v$: the steering wheel angle, $A_{veq}$: the equivalent steering wheel angle.

The fusion gain G depends on the longitudinal speed $V_h$ of the vehicle.

Finally, during a calculation phase P3, the target speed $V_c$ is determined from the final steering wheel angle $A_f$ and the longitudinal speed $V_h$.

The reversibility function $F_3$ comprises a second step in which, from the target speed $V_c$, the third fraction $C_{C3}$ of the setpoint torque $C_c$ is determined in a manner known to those skilled in the art.

The TTG development step adds the first fraction $C_{C1}$, the second fraction $C_{C2}$, and the third fraction $C_{C3}$ so as to obtain the setpoint torque $C_c$.

Of course, the invention is not limited to the embodiments described and represented in the appended figures. Changes remain possible, in particular from the point of view of the constitution of the various elements or by substitution of technical equivalents, without thereby departing from the scope of protection of the invention.

The invention claimed is:

1. A method for determining a setpoint torque for a steering wheel of a power steering system of a vehicle, the setpoint torque allowing determining a motor torque which is applied directly or indirectly by a control motor on the steering wheel, the setpoint torque being at least determined by a reversibility function intended to bring a steering wheel angle of the steering wheel towards the steering wheel angle for which the vehicle performs a straight-line trajectory, the reversibility function comprising a first step in which a target speed of the steering wheel is determined as a function of the steering wheel angle, wherein the target speed is also a function of a yaw rate of the vehicle.

2. The determination method according to claim 1, wherein the first step comprises a determination phase in which an equivalent steering wheel angle is calculated as a function of the yaw rate of the vehicle, an equivalent gain and a longitudinal speed of the vehicle.

3. The determination method according to claim 2, wherein the equivalent gain depends on the longitudinal speed of the vehicle.

4. The determination method according to claim 2, wherein the first step comprises a fusion phase in which a final steering wheel angle is determined from the equivalent steering wheel angle and the steering wheel angle.

5. The determination method according to claim 4, wherein the final steering wheel angle depends on a fusion gain.

6. The determination method according to claim 5, wherein the fusion gain varies as a function of the longitudinal speed of the vehicle.

7. The determination method according to claim 5, wherein the fusion gain varies between 0 and 1.

8. The determination method according to claim 1, comprising a second step in which a setpoint torque of the reversibility function is determined from the target speed.

* * * * *